United States Patent [19]

Kraft et al.

[11] Patent Number: 4,946,266
[45] Date of Patent: Aug. 7, 1990

[54] UNIVERSAL OBJECT HOLDER FOR MICROSCOPES

[75] Inventors: Winfried Kraft, Asslar; Volker Wuerfel, Braunfels; Wolfram Stebel, Berlin; Heinz Maerzhaeuser, Wetzlar, all of Fed. Rep. of Germany

[73] Assignee: Ernst Leitz Wetzlar GmbH, Fed. Rep. of Germany

[21] Appl. No.: 245,147

[22] Filed: Sep. 16, 1988

[30] Foreign Application Priority Data

Sep. 16, 1987 [DE] Fed. Rep. of Germany ....... 3731120

[51] Int. Cl.⁵ ............................................. G02B 21/26
[52] U.S. Cl. ...................................... 350/529; 269/21; 248/362
[58] Field of Search ........................ 350/529, 530, 536; 269/21; 248/362

[56] References Cited

U.S. PATENT DOCUMENTS

| | | | |
|---|---|---|---|
| 3,848,962 | 11/1974 | Nelson | 350/86 |
| 4,436,385 | 3/1984 | Fischer et al. | 350/529 |
| 4,557,568 | 12/1985 | Van Benschoten | 350/531 |
| 4,641,930 | 2/1987 | Podvin et al. | 350/529 |
| 4,784,377 | 11/1988 | Woodward | 269/21 |
| 4,787,800 | 11/1988 | Sone et al. | 269/21 |

FOREIGN PATENT DOCUMENTS

| | | |
|---|---|---|
| 2449291 | 4/1975 | Fed. Rep. of Germany . |
| 3028154 | 3/1982 | Fed. Rep. of Germany . |
| 3321853 | 12/1983 | Fed. Rep. of Germany . |
| 2122375 | 1/1984 | United Kingdom . |
| 2122376 | 1/1984 | United Kingdom ............ 350/529 |

Primary Examiner—Bruce Y. Arnold
Assistant Examiner—Ronald M. Kachmarik
Attorney, Agent, or Firm—Foley & Lardner, Schwartz, Jeffery, Schwaab, Mack, Blumenthal & Evans

[57] ABSTRACT

An object holder for use on a microscope exhibits a frame having a shaped-on, deeper-lying contact surface, in which air suction openings are disposed for the fixing of the respective object. An adjustable abutment strip with a shaped-on bearing surface is provided, in order to retain plate-shaped objects, especially wafers or masks of the most widely varying shapes and sizes.

14 Claims, 5 Drawing Sheets

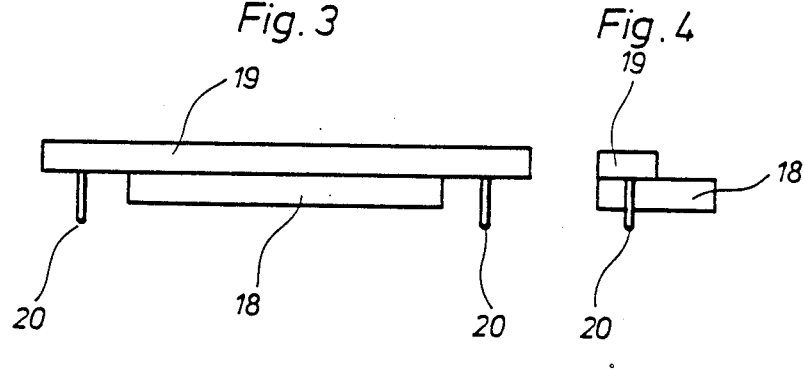
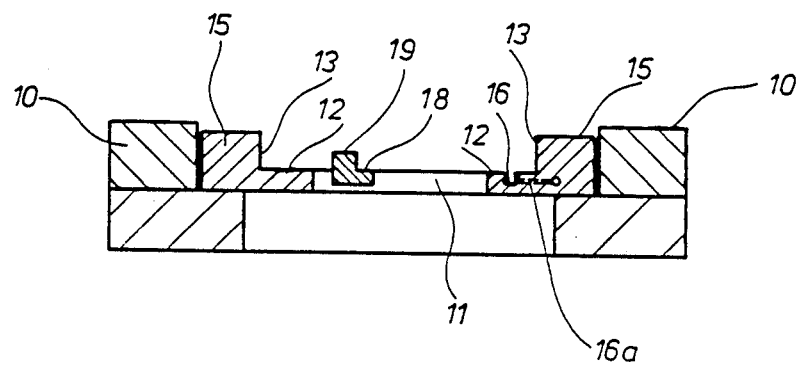

UNIVERSAL OBJECT HOLDER FOR MICROSCOPES

BACKGROUND OF THE INVENTION

The invention relates to a universal object holder for plate-shaped objects of differing dimensioning for use on a microscope.

In the production of chips, specially coordinated reflected-light/transmitted-light microscope arrangements are used under clean-room conditions in order to observe wafers or masks and to obtain an overview of occurring defects. If now, on cost grounds, the use of fully automatic inspection microscopes is dispensed with, or if the numbers of units involved are small, then the individual wafers or masks must be inserted into the microscope manually. In this case, there is the danger that the fragile wafers or masks will be damaged by the conventional clamping devices secured to the microscope stage. Furthermore, the holding or clamping devices must be designed to be abrasion-resistant and free from gas-liberating lubricants or lacquers.

Holding devices which satisfy these conditions are already known and consist essentially of a frame which is mounted on a microscope stage. By means of individual prefabricated rings, which can be inserted into this frame and which have differing dimensions, a defined mounting for the most widely varying mask sizes may be achieved. The exchange of the masks or wafers can take place from above, in which case these contact the bearing surface only by their edge regions. However, a disadvantage is represented by the multiplicity of the required rings in order to retain the currently known sizes and shapes. Masks or wafers are protected by this holding device only against a lateral sliding, since a definitive securing of the wafer or of the masks is not possible. Accordingly, it has proved to be an advantage to retain such sensitive objects by means of a vacuum device.

Such an object holder is known from DE-OS No. 3,321,853, and consists essentially of a U-shaped body part, the bottom of which is equipped with a plane contact surface. Furthermore, pinshaped abutments for the positioning of slides are fitted into the bottom. In the contact surface, air sucking-in openings are provided, which are connected to a channel within the body part. A reduced pressure may be generated in this channel by means of a vacuum pump so that the slides are pressed against the force of gravity onto the contact surface.

However, this object holder exhibits the disadvantage that it may be used only for slides of a definite shape and size. Furthermore, the objects must be placed in position from below. However, such a retention does not enter into consideration for objects with highly sensitive surfaces.

A further object holder is known from DE-PS No. 2,449,291. Two upright base bodies are disposed with respective arms opposite one another on a stage. These arms exhibit a plane slide-directing surface, which points in the direction of the stage. Furthermore, the slide-directing surfaces are equipped with openings, which are connected to vacuum lines. The air is evacuated by means of an appropriate pump, and the slide is held against the force of gravity by the reduced pressure.

This object holder also accepts only slides of a specified size and shape, and, in addition, exhibits the disadvantage that the sensitive surface of a wafer is pressed against a contact surface.

U.S.-PS No. 4,557,568 discloses an object holder for the mounting of masks with and without a pellicle frame of differing size. To this end, this object holder exhibits a rectangular frame, with which two mutually opposite strips each having a respective bearing surface are associated. These strips are connected to the frame by means of screws or can be displaced relative to one another by means of drive means. In the strips a plurality of bores are present into which pins are introduced in order to secure the objects against a lateral displacement. Accordingly, this object holder can be adapted to the most widely varying dimensions of rectangular masks. However, it is a disadvantage that only two bearing surfaces are provided, and accordingly the danger of bowing exists in the case of large masks. As a result of the pins, especially round masks may only inadequately be secured against a lateral displacement, it being possible for the exchange of masks to take place only by exact vertical feed or removal.

The foregoing illustrates limitations known to exist in present devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

The object of the invention is accordingly to avoid the disadvantages of the prior art and to provide an object holder which can accept objects of differing size and shape in a vibration-free manner and can position them in a defined manner, a contamination-free, ergonomically favorable object handling being moreover guaranteed.

This is accomplished by providing a universal object holder for the selective reception of plateshaped objects of differing dimensioning, especially of wafers, masks or masks with a pellicle frame i.e. a frame in which a transparent mask is restrained, for use on a microscope, the object holder including a rectangular frame exhibiting an internal clear opening, abutments stepped in the manner of a staircase being associated with said frame, the steps forming a surface for supporting the objects, and means for limiting the support being provided. The frame exhibits a continuous, deeper-lying contact surface which is provided in one piece. Air suction openings which are disposed over a corner and which are connected to a vacuum device are present in the contact surface. In order to limit the support, only an adjustable abutment strip having a bearing surface is additionally provided.

The foregoing and other aspects will become apparent from the following detailed description of the invention when considered in conjunction with the accompanying drawing figures. It is to be expressly understood, however, that the drawing figures are not intended as a definition of the invention, but are for the purpose of illustration only.

BRIEF DESCRIPTION OF THE DRAWINGS

In the drawings:

FIG. 3 shows the front elevation of the abutment strip;

FIG. 4 shows the abutment strip in side elevation; and

FIG. 5 shows a cross-section through the object holder along the line V—V shown in FIG. 1;

DETAILED DESCRIPTION OF THE PREFERRED EMBODIMENTS

Figure 1:
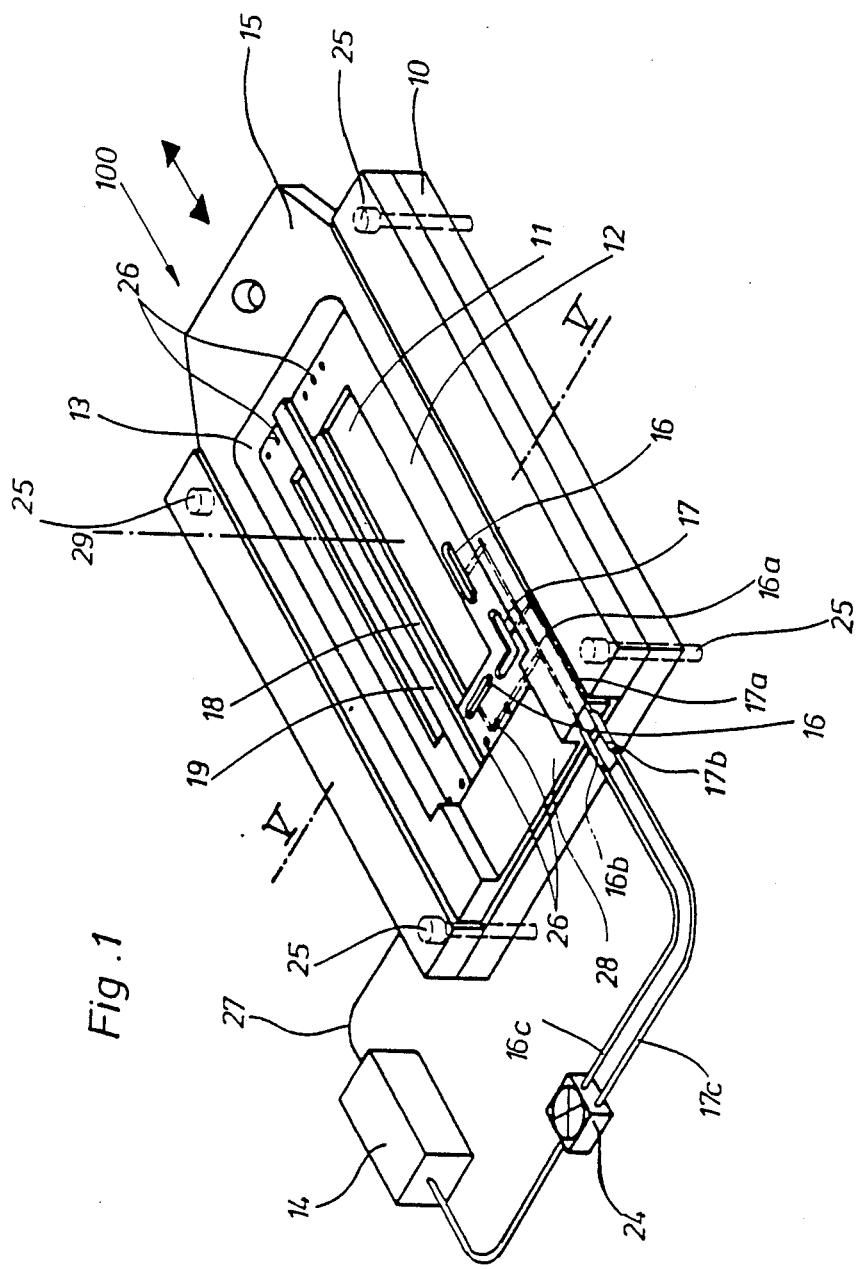
FIG. 1 shows a perspective view of an object holder in the working position.

FIG. 1 shows an object holder 100 having a base plate designed as a rectangular frame 15. This exhibits a clear opening 11 in its interior; in this arrangement, a deeper-lying contact surface 12 to form a support for a mask or wafer which has not also been represented is shaped in a continuous manner onto the inner edges 13 of the frame 15. Through the contact surface 12, the inner edges 13 of the frame 15 serve at the same time as abutments for the positioning of the object, which has also not been represented. Furthermore, an array of apertures 26 is provided in the contact surface 12, in order to receive an additional adjustable abutment strip 19 with shaped-on positioning pins 20. In the region of the clear opening 11 of the frame 15, this abutment strip 19 exhibits a bearing surface 18 for the object to be retained. The bearing surface 18 is disposed on the adjustable abutment strip 19 in such a manner that it lies in a plane with the contact surface 12. Air suction openings 16, 17 are disposed in the contact surface 12 facing the bearing surface 18, over a corner. Connecting channels 16a, 17a are provided in the interior of the frame 15, in order to connect the air suction openings 16, 17 to a respective external connection 16b, 17b. Via appropriate hose lines 16c, 17c, these connections 16b, 17b are connected to a vacuum device 14 via an interposed valve 24. By means of the valve 24, the suction openings 16, 17 may be selectively controlled or both may be controlled at the same time.

The air suction opening 17 is disposed in the contact surface 12 so as to be dimensioned in such a manner that rectangularly designed objects of any size which can be adjusted by means of the abutment strip 19 are sucked. Round objects or objects having rounded-off corners can cover over only partial regions of the air suction opening 17; this leads to an inadequate securing affected by considerable noises. Accordingly, it is necessary to operate the securing of the object by means of the air suction opening 16.

In FIG. 1 an additional frame part 10 is also shown, in which the object holder 100 is disposed so as to be displaceable in the direction of the double arrow. The frame part 10 exhibits adjusting screws 25, which serve for the securing and orientation of the object holder 100 on a scanning stage (not shown) of a microscope.

Figure 2:
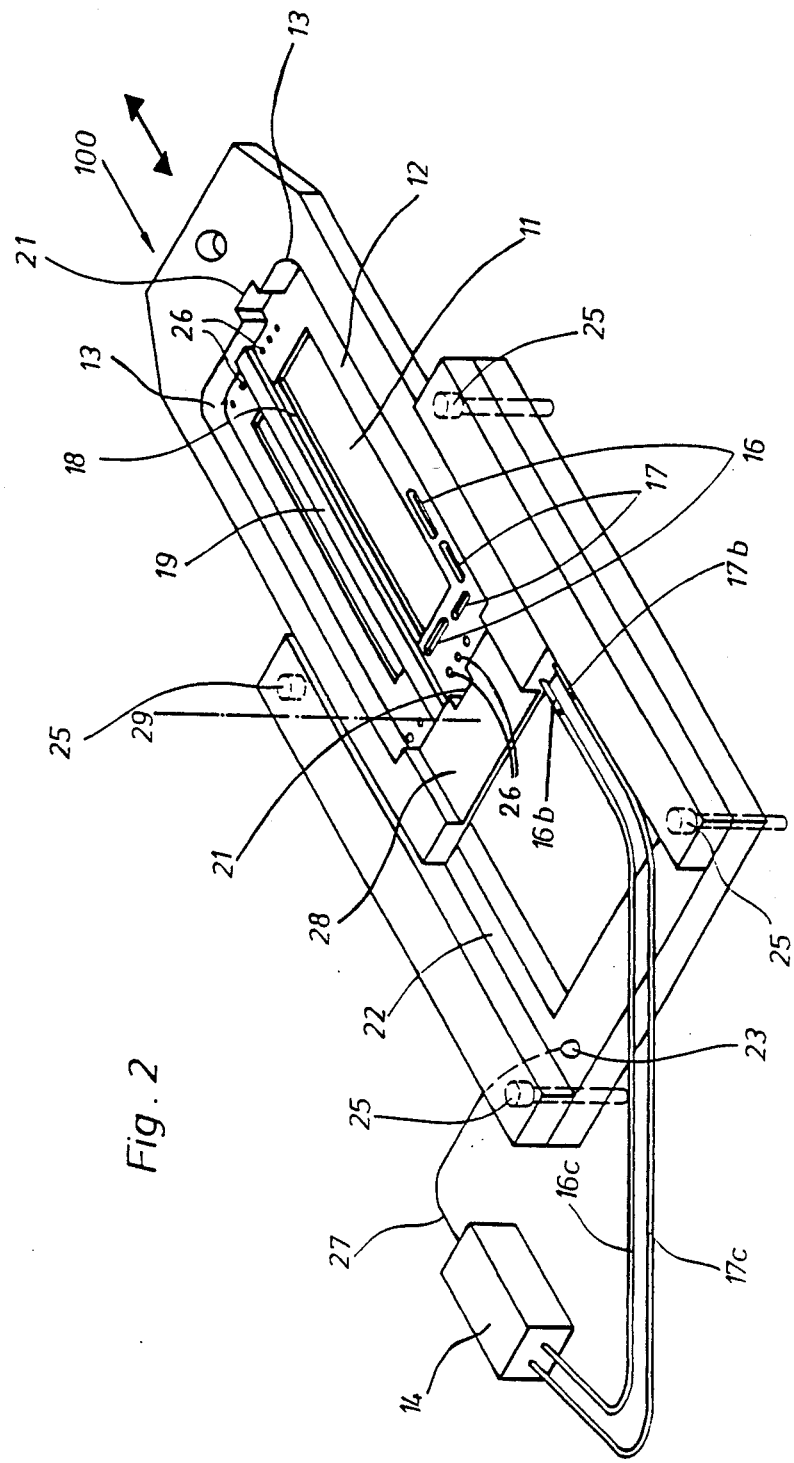
FIG. 2 shows a perspective view of the object holder in the object-exchange position.

FIG. 2 shows the object holder 100 with the frame 15 displaced. In this position, the optical axis 29, shown in broken lines, of the microscope stands directly perpendicular to a recess 28, which is provided on the frame 15 and which serves to maintain the free working separation between the objective and the object in the region of the displacement path 22. In this position, a wafer or a mask can thus be inserted into the object holder without altering the focus of the microscope objective.

In FIG. 2, in contrast to FIG. 1, the air suction opening 17 is not designed to be continuous but in two individual openings disposed at right angles to one another. This is advantageous especially in circumstances in which these individual openings are separately connected to the vacuum device 14 and means for the selective control of the individual openings are provided.

For the better handling of a wafer or of a mask, a recess 21 extending as far as the contact surface 12 and, opposite, a further recess 21 are provided in the recess 28, in order to exchange the objects by means of a commercially conventional mask gripper.

In the displacement path 22 of the frame part 10 a push button 23 is disposed, which is electrically connected to the vacuum device 14 via a line 27. In the position shown here, the current circuit to the vacuum device 14 is interrupted so that an easier exchange of an object in the object holder 100 is possible. By pushing in the frame 15, this push button 23 is actuated and the current circuit to the vacuum device 14 is closed. Furthermore, this push button 23 can end, under spring pressure, by a ball, and can at the same time limit the displacement path 22 of the frame 15 by ball engagement.

The hose lines 16c and 17c are connected to the vacuum device 14 without an interposed valve 24 as represented in FIG. 1. In this case other means for controlling the air suction openings 16, 17, for example, a three-way tap, can, of course, be provided.

FIG. 3 shows the abutment strip 19 in a front elevation with the two positioning pins 20 and the shaped-on bearing surface 18, while in FIG. 4 the corresponding side elevation is represented.

The deeper-lying bearing surface 18 forms a right angle with the abutment strip 19 so that, besides a plane support for an appropriate object, an abutment against lateral sliding is also provided.

FIG. 5 shows a cross-section through the object holder 100 with the frame part 10 along the line V—V shown in FIG. 1. The object holder 100 is retained in the frame part 10 and exhibits the clear opening 11. The abutment strip 19 is also shown, the bearing surface 18 of which is disposed in a plane with the contact surface 12 of the frame 15. The connecting channel 16a provided in the frame 15 is connected to the air suction opening 16.

Figure 6:
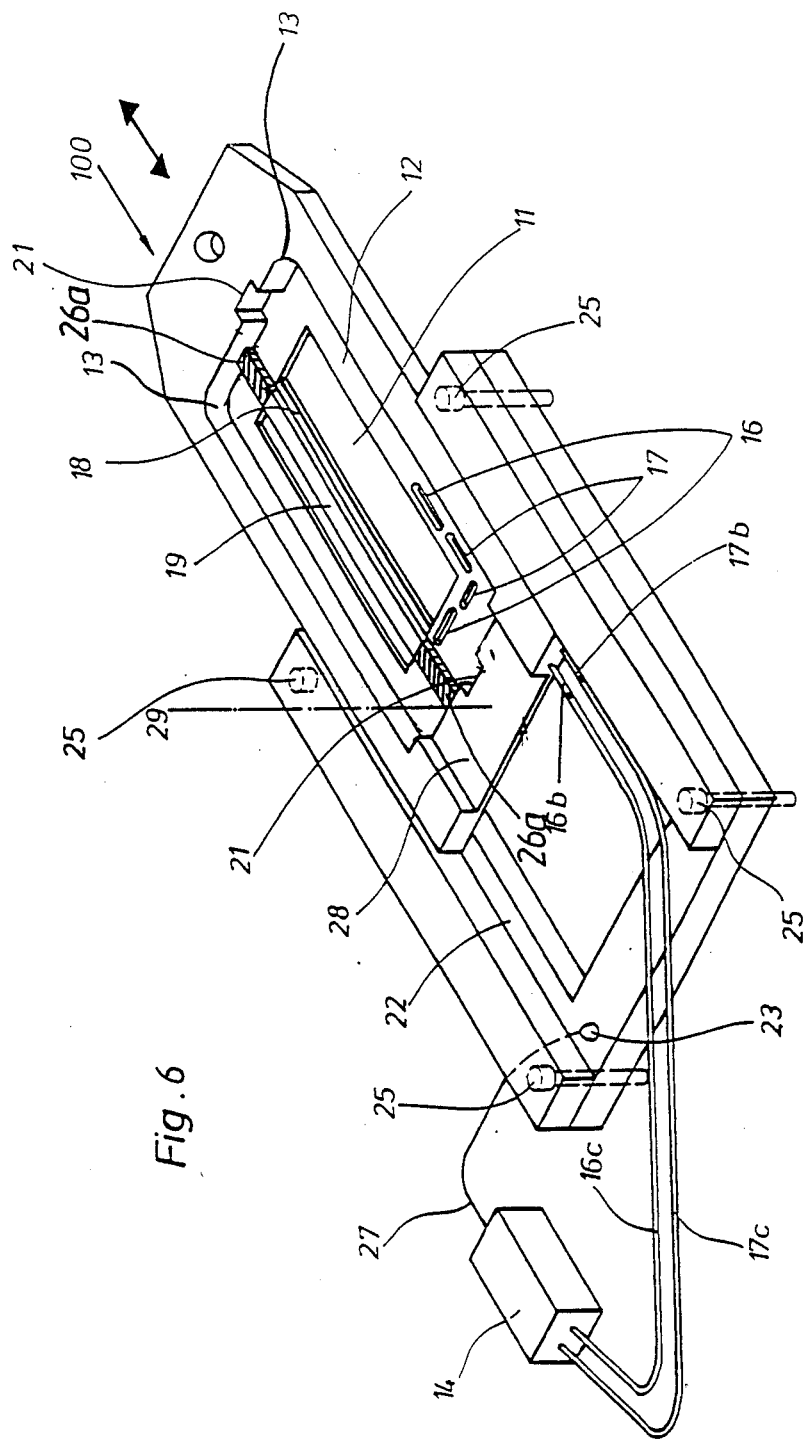
FIG. 6 shows another embodiment of the invention in which the abutment strip is retained by magnets.

FIG. 6 shows another embodiment of the invention in which the abutment strip 19 is retained by magnets 26a on the contact surface 12.

Figure 7:
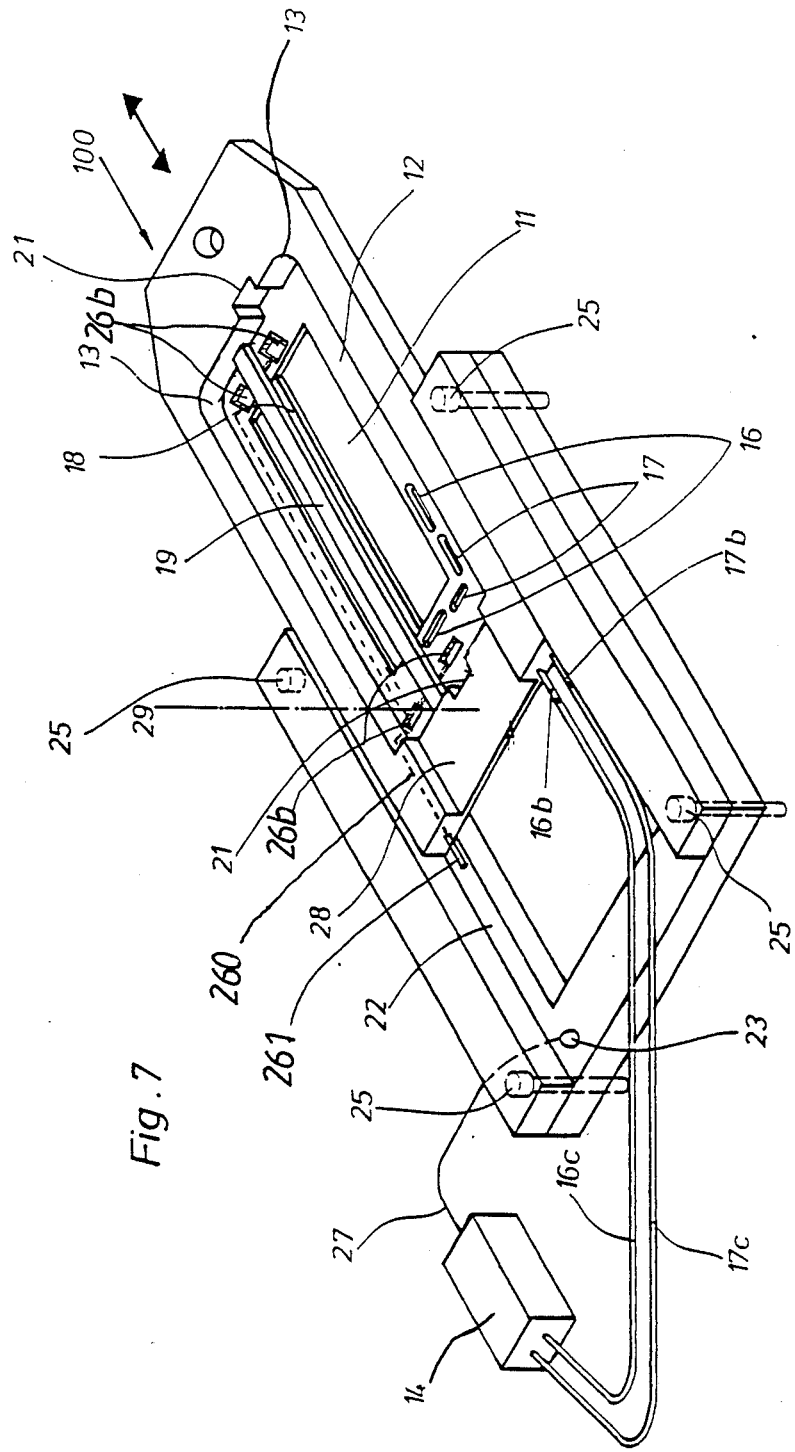
FIG. 7 shows a further embodiment of the invention in which the abutment strip is retained by a separate vacuum suction device.

FIG. 7 shows a further embodiment of the invention in which the abutment strip 19 is retained on the contact surface 12 by a separate vacuum suction device 26b. The air suction openings of the separate vacuum suction device 26b are connected by the lines 260 to a joining piece 261. This joining piece 261 is connected by connecting lines (not shown) with a vacuum pump (not shown).

What is claimed is:

1. A universal object holder for the selective reception of plate-shaped objects of differing dimensioning, especially of wafers, masks or mask with a pellicle frame, for use on a microscope, having reflected light and transmitted light illumination, comprising:
   a rectangular frame exhibiting an internal clear opening;
   abutments stepped in the manner of a staircase associated with said frame, the steps forming along the inner edges of said frame a continuous, stepped-down contact surface which is provided in one piece for supporting the objects;

air suction openings disposed over a corner and connected to a vacuum device are provided in the contact surface; and one adjustable abutment strip having a bearing surface for supporting said objects over said clear opening.

2. The object holder as claimed in claim 1, wherein the abutment strip includes at least two positioning pins and a corresponding array of apertures is provided in the contact surface.

3. The object holder as claimed in claim 1, wherein the abutment strip is magnetically retained on the contact surface.

4. The object holder as claimed in claim 1, wherein the abutment strip is retained on the contact surface by means of a separate vacuum suction device.

5. The object holder as claimed in claim 1, wherein the object holder is moveable in the manner of a carriage in an additional frame part.

6. The object holder as claimed in claim 5, wherein a push button for activating/disabling the vacuum device is provided in the displacement path of the frame part.

7. The object holder as claimed in claim 6, wherein additional means for a ball engagement with the object holder are associated with the push button.

8. The object holder as claimed in claim 1, wherein the air suction openings are disposed, opposite the bearing surface, over a corner in the contact surface.

9. The object holder as claimed in claim 8, wherein the air suction opening is disposed in the contact surface so as to be dimensioned in such a manner that it sucks an object by its full opening in any position of the abutment strip.

10. The object holder as claimed in claim 8, wherein means for the selective control of individual or a plurality of openings are associated with the air suction openings.

11. The object holder as claimed in claim 1, wherein two opposite recesses, extending as far as the contact surface, for exchanging the objects are provided in the frame.

12. The object holder as claimed in claim 1, wherein adjusting screws for securing and orienting the object holder on a microscope stage are disposed at the frame part.

13. The object holder as claimed in claim 1, wherein the frame part is designed as the stage of a scanning device.

14. A universal object holder for the mounting of plate-shaped objects, especially of wafers or masks, for use on a microscope having reflected-light and transmitted-light illumination, the object holder having a base plate, a mounting which is disposed thereon and which has a plane contact surface and abutments for the positioning of the objects, and having a vacuum device and air suction openings in the contact surface, wherein the base plate is constructed as a rectangular frame having an internal clear opening, a continuous, deeper-lying contact surface being shaped onto the inner edges of the frame as mounting for the respective object, and an adjustable abutment strip having a bearing surface in the plane of the contact surface.

* * * * *